US008894298B2

United States Patent
Wakjira et al.

(10) Patent No.: US 8,894,298 B2
(45) Date of Patent: Nov. 25, 2014

(54) DEBRIS REDUCING MULTI-FIBER CONNECTOR AND ADAPTER AND ASSOCIATED METHODS

(71) Applicant: US Conec, Ltd., Hickory, NC (US)

(72) Inventors: Jillcha Fekadu Wakjira, Hickory, NC (US); Darrell R. Childers, Hickory, NC (US); Eric Childers, Hickory, NC (US); Michael E. Hughes, Hickory, NC (US)

(73) Assignee: US Conec, Ltd, Hickory, NC (US)

( * ) Notice: Subject to any disclaimer, the term of this patent is extended or adjusted under 35 U.S.C. 154(b) by 0 days.

(21) Appl. No.: 13/942,648

(22) Filed: Jul. 15, 2013

(65) Prior Publication Data

US 2014/0044396 A1 Feb. 13, 2014

Related U.S. Application Data

(60) Provisional application No. 61/671,353, filed on Jul. 13, 2012.

(51) Int. Cl.
*G02B 6/36* (2006.01)
*G02B 6/38* (2006.01)

(52) U.S. Cl.
CPC ................ *G02B 6/3893* (2013.01); *G02B 6/38* (2013.01)
USPC .................... 385/77; 385/53; 385/76; 385/78; 385/81

(58) Field of Classification Search
CPC .. G02B 6/3825; G02B 6/3887; G02B 6/3821; G02B 6/3893; G02B 6/3885; G02B 6/36
USPC ...................... 385/53, 76, 77, 78, 81
See application file for complete search history.

(56) References Cited

U.S. PATENT DOCUMENTS

| 6,154,597 | A * | 11/2000 | Roth | 385/139 |
| 8,186,890 | B2 * | 5/2012 | Lu | 385/60 |
| 2006/0022456 | A1 * | 2/2006 | Hull et al. | 285/179 |

* cited by examiner

*Primary Examiner* — Jennifer Doan
(74) *Attorney, Agent, or Firm* — Michael L. Leetzow, P.A.

(57) ABSTRACT

A fiber optic connector has a connector outer housing and a connector inner housing. The connector inner housing has a projection to interact with a latch on an adapter into which the connector is inserted. The force required to move the connector outer housing relative to the connector inner housing is less than the force to remove the connector inner housing from the latch. A groove or opening may also be formed in the connector outer housing to effectively shorten the connector outer housing and prevent interaction of the latch with the outer housing, reducing debris.

10 Claims, 8 Drawing Sheets

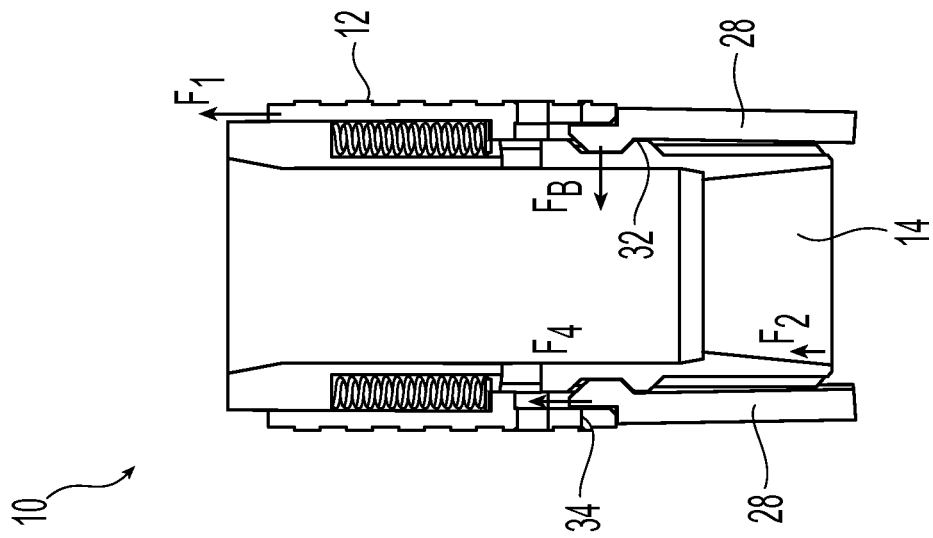
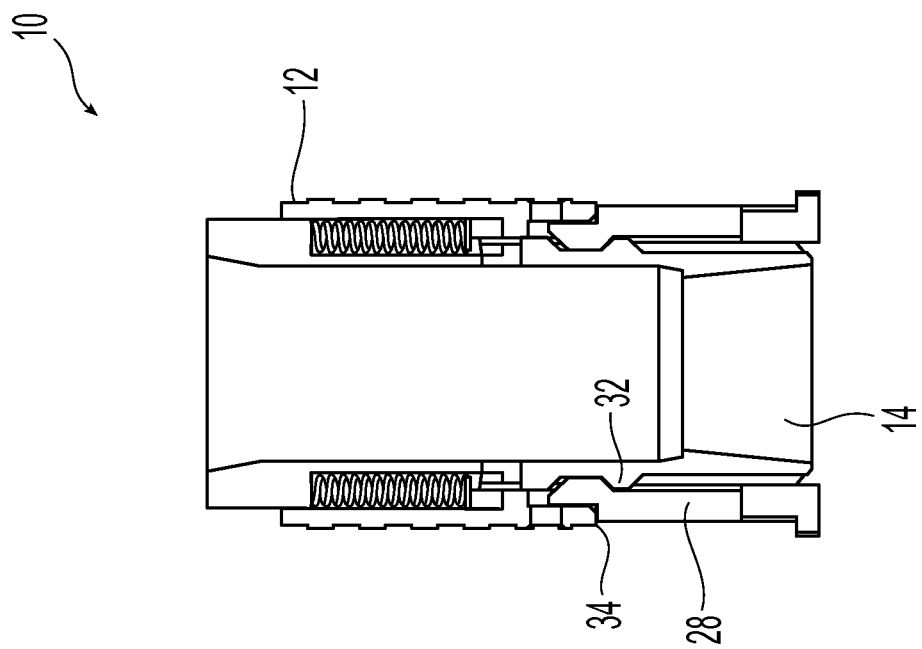

Fig. 8

| Description | #Debris | Debris Size (um2) | # of Pairs Under Test | Debris Size Per Connector (um2/conn) |
|---|---|---|---|---|
| *No Latch Beam<br>*This is a condition where Fa=Fb=0 | 6 | 20602 | 5 | 4120 |
| *Lower spring force in connector outer housing<br>*This is a condition where F1<F2&F3<F4&Fa>F3 | 33<br>38 | 41126<br>42614 | 5<br>5 | 8225<br>8523 |
| *Standard, high spring force in connector outer housing<br>*This is a condition where F1>F2&F3>F4&Fa>F3 | 29<br>55 | 106336<br>238151 | 5<br>5 | 21267<br>47630 |

Fig. 9

| Description | #of Mates | #of Pairs Under Test | Total Area of Debris (um²) | Area (um²) per connector |
|---|---|---|---|---|
| *Lower adapter latch strength<br>*Improved contact area between Adapter Latchand Connector Inner Housing<br>*Lower connector outer spring force<br>*This is a condition where F1<F2&F3<F4&F3 | 30 | 5 | 4880 | 488 |
| *Lower adapter latch strength<br>*Standard contact area between Adapter Latch and Connector Inner Housing<br>*Lower connector outer spring force<br>*This is a condition where F1<F2&F3<F4&Fa>F3, but there is a higher friction between AL and CIH | 30 | 5 | 13442 | 1,344 |
| *Standard adapter latch strength<br>*Standard contact area between adapter-latch and connector-innerhousing<br>*Standard connectorOouter spring force<br>*This is a condition where F1>F2&F3>F4&Fa>F3, and there is a higher friction between AL and CIH | 30 | 5 | 48351 | 4,835 |

DEBRIS REDUCING MULTI-FIBER CONNECTOR AND ADAPTER AND ASSOCIATED METHODS

REFERENCE TO RELATED CASE

This application claims priority under 35 U.S.C. §119(e) to provisional application No. 61/671,353, filed on Jul. 13, 2012, which is hereby incorporated by reference in its entirety.

BACKGROUND OF THE INVENTION

Field of the Invention

Fiber optic connectors are mated to one another through an adapter that aligns and holds the fiber optic connectors. These fiber optic connectors may be mated and unmated multiple times. When the fiber optic connectors are unmated (one side being open), dust and debris may collect on the face of the fiber optic connector that remains in the adapter. However, even when the fiber optic connectors are connected, debris can still accumulate on the faces of the fiber optic connectors. This is particularly true with the MTP®/MPO style (MT style) fiber optic connectors with inner and outer connector housings. During the mating and unmating process, the connector housings and the latch arms of the adapters rub against one another causing, in part, the debris that accumulates on the face of the fiber optic connectors. Other considerations and sources of the debris involve the material type, accuracy of the mating components, and the forces of the components of the mating interface during the mating process.

Thus, a new style of multi-fiber connector is needed such that upon mating of the multi-fiber connectors there is a reduction in the generation of debris that affects the optical connection between the mated pairs of multi-fiber connectors.

SUMMARY OF THE INVENTION

The present invention is directed to a fiber optic connector for insertion into an adapter, the adapter having at least one latch, the connector includes an inner connector housing having at least one projection to interact with the at least one latch, an outer connector housing, the outer connecting housing surrounding at least a portion of the inner connector housing, the outer connector housing passing over the at least one latch when inserted into the adapter, and a resilient element engaging the inner connector housing and the outer connector housing and biasing the outer connector housing toward a front end of the inner connector housing, the resilient member having a spring force that is less than a spring force applied by the at least one latch against the at least one projection during insertion or removal of the inner connector housing from the adapter.

In some embodiments, the resilient member has a spring constant and the spring constant is smaller than that of a spring constant of the at least one latch In some embodiments, the spring force of the at least one latch is reduced by lengthening the at least one latch.

In yet another aspect, the invention is directed to a fiber optic connector for insertion into an adapter, the adapter having at least one latch, the connector includes an inner connector housing having at least one projection to interact with the at least one latch, an outer connector housing having a front end, a back end, and an opening extending therebetween, the opening having a surface and surrounding at least a portion of the inner connector housing, the surface having at least one groove extending from the front end towards the back end to receive at least a portion of the at least one latch through the front end, and a resilient element engaging the inner connector housing and the outer connector housing and biasing the outer connector housing toward a front end of the inner connector housing.

In yet another aspect, the present invention is directed to a fiber optic connector for insertion into an adapter, the adapter having at least one latch, the connector that includes an inner connector housing having at least one projection to interact with the at least one latch, an outer connector housing having a front end, a back end, and an opening extending therebetween, the opening surrounding at least a portion of the inner connector housing, the outer connector housing having at least one side opening corresponding to the at least one latch and at least one projection, the side opening extending from the front end towards the back end and disposed to receive a laterally moved at least one latch, and a resilient element engaging the inner connector housing and the outer connector housing and biasing the outer connector housing toward a front end of the inner connector housing.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 5 is a partial cross section view of an inner and outer connector housing after engagement with the latch arms of the adapter;

FIG. 6 is a partial cross section view of an inner and outer connector housing during disengagement from the latch arms;

FIG. 8 is a table illustrating the results of matings and the debris created and accumulated on the faces of the fiber optic connectors with different connector and adapter parameters;

FIG. 9 is another table illustrating the results of matings and the debris created and accumulated on the faces of the fiber optic connectors with different connector and adapter parameters;

DETAILED DESCRIPTION OF THE PREFERRED EMBODIMENTS

Figure 1:
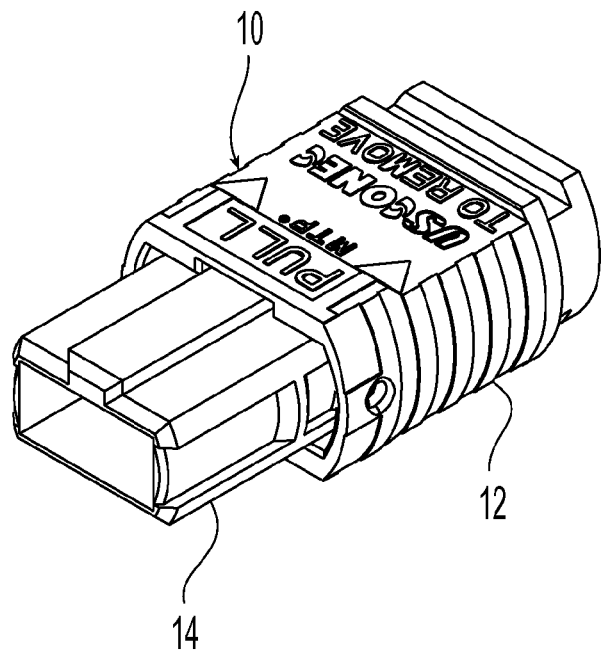
FIG. 1 is a top, front perspective view of an outer and inner connector housing for a multi-fiber connector.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
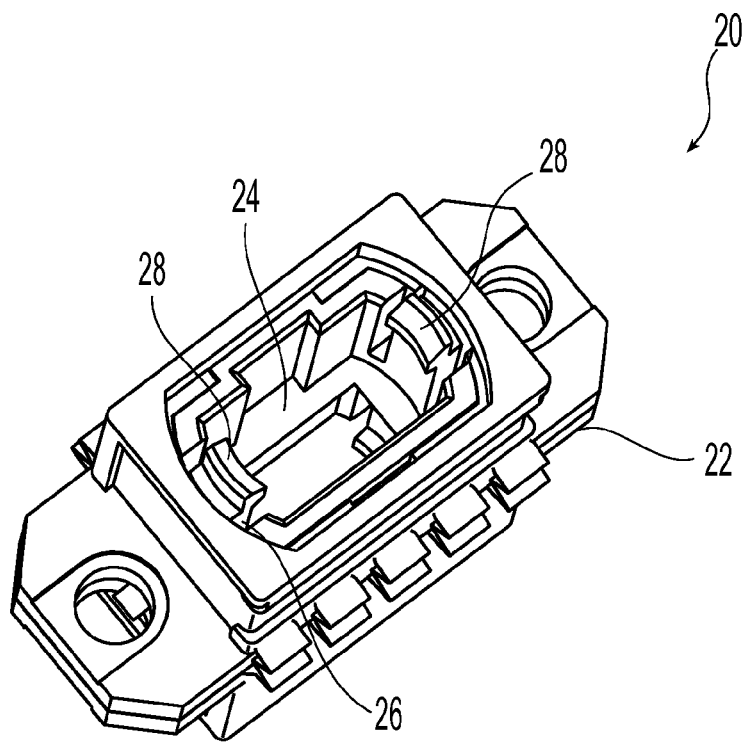
FIG. 2 is a perspective view of an adapter to be used with multi-fiber connector and the housings of FIG. 1.

Referring to the figures, a connector housing 10 for an MT style connector is illustrated. The connector housing 10 includes an outer connector housing 12 and an inner connector housing 14. The other connector components are not illustrated in the figures for clarity. However, one of ordinary skill in the art would understand the other components that would be used with the connector housing 10 to make the multi-fiber connector operable. As illustrated, the outer connector housing 12 surrounds, and preferably completely surrounds, the inner connector housing 14. The outer connector housing 12 is movable relative to the inner connector housing 14, which is described in more detail below. The outer connector housing 12 is biased in a forward position (out of the page as illustrated in FIG. 1) relative to the inner connector housing 14 by a resilient member 16. See FIG. 3. As illustrated, the resilient member 16 is a coil spring, but can be any elastic element FIG. 2 illustrates an adapter 20 that will engage and hold the connector housing 10 (and the connector if fully assembled). The adapter 20 has a housing 22 with an opening 24 that extends through the adapter 20 to mate two of the multi-fiber connectors. The adapter 20 has on each side a pair of latches 26. Each of the pair latches 26 include a pair of latch arms 28. The latch arms 28 are attached in a cantilevered manner so that when the connector housing 10 is inserted into the adapter 20, the latch arms 28 flex outwardly and, then due to the cantilevered construction, flex back inwardly to engage a projection on the connector housing 10, as discussed in more detail below.

Figure 3:
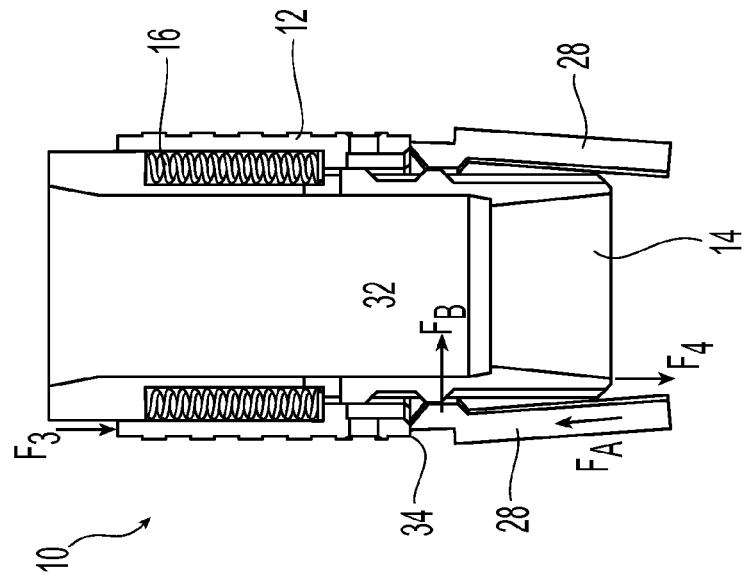
FIG. 3 is a partial cross section view of an inner and outer connector housing prior to engagement with the latch arms of an adapter.
Figure 4:
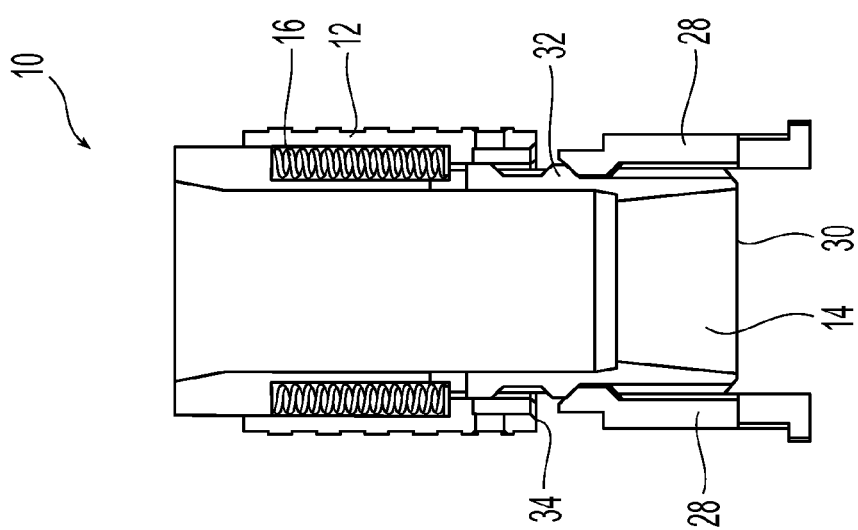
FIG. 4 is a partial cross section view of the outer connector housing and the latch arm as they engage one another during insertion of the connector in the adapter.

FIGS. 3-7 illustrate the mating and unmating of a connector housing 10 with the latch arms of an adapter 20. Turning to FIG. 3, as the front end 30 of the inner connector housing 14 is inserted into the adapter, the latch arms 28 begin to approach the projection 32 on each side of the inner connector housing 14. The chamfered portions of both the latch arms 28 and the projection 32 allow the latch arms 28 to flex outwardly and over the projections 32. As the connector housing 10 is further inserted into the adapter 20, the latch arms 28 engage the front end 34 of the outer connector housing 12. See FIG. 4. The connector outer housing 12 is biased forward toward the front end of the connector inner housing 14 and the adapter by the resilient member 16 with a force $F_3$. The latch arms 28 apply a force $F_A$ against the connector outer housing 12. Simultaneously, the adapter latch arms 28 apply a force $F_B$ against the projections 32 of the connect their inner housing 14. As also illustrated in FIG. 4, the connector inner housing 14 is inserted into the adapter with the force $F_4$. It should be noted that the forces discussed and illustrated in the figures are vector forces. As will be recognized, the force $F_4$ must be greater than the force $F_3$ in order to push the connector outer housing 12 backward relative to the inner connector housing 14 so that the latch arms 28 can engage the projections 32.

Figure 7:
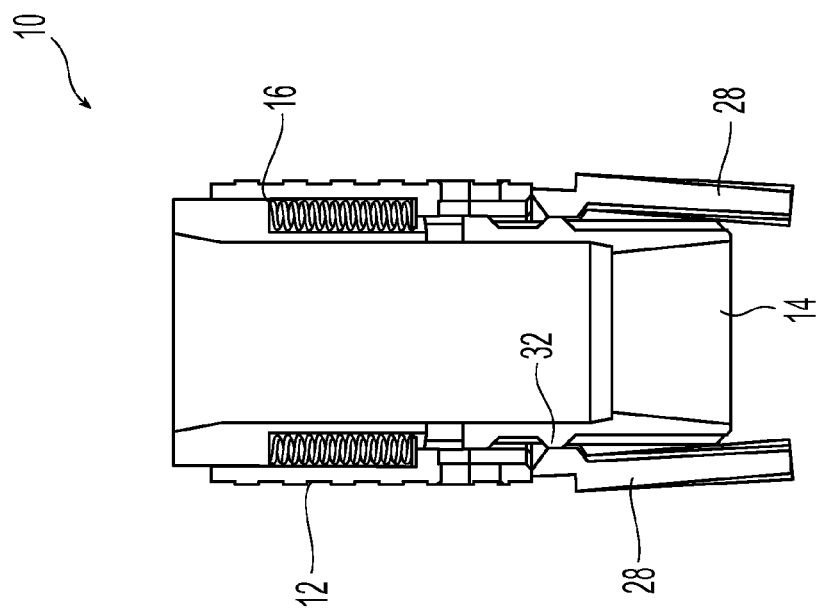
FIG. 7 is a partial cross section view of an inner and outer connector housing as the inner and outer connector housings clear the latch arms of the adapter.

FIG. 5 illustrates the connector housing 10 engaging in a mated position with the adapter 20 and the latch arms 28 secured in their relative position by the connector outer housing 12. In FIG. 6, the connector outer housing 12 is pulled rearwardly with a force $F_1$, while the connector inner housing 14 is simultaneously pulled back with a force of $F_2$. The latch arms 28 apply a force $F_B$ inward toward the inner connector housing 14 and a force $F_A$ toward the connector housing 10. At the point of mating illustrated in FIG. 6, the connector outer housing 12 typically does not clear, in a rearward direction, the end of latch arms 28 before the latch arms 28 begin to move outwardly as a result of the relative movement of the connector inner housing 14 and the latch arms 28 and $F_A$. As a result, the latch arms 28 make contact with the connector outer housing 12 and with the connector inner housing 14 and cause debris to be generated. FIG. 7 illustrates the un-mating of the connector housing 10 and the latch arms 28 of the adapter 20.

In order for the connector outer housing 12 to be moved an appropriate distance rearwardly to clear the latch arms 28, the force required to move the connector outer housing 12 as sufficient distance rearwardly should be less than the force required to start the disengagement of the latch arms 28 from the connector inner housing 14. In other words, according to FIG. 6, $F_1$ should be less than $F_2$, which is not the case as illustrated in FIG. 6. As also discussed in more detail below, reducing the forces associated with the latch arms 28 ($F_A$, $F_B$) also reduces the amount of debris generated by the engagement and rubbing of the connector housing 10 and the adapter 20. However, $F_B$ should be large enough to ensure that the latch arm 28 can slide over and engage the projection 32 on connector inner housing 14.

FIG. 8 illustrates two different tests conducted to determine the amount of debris generated and found on the faces of optical ferrules that are in the connector housings. The test was comprised of 30 matings/unmatings of 5 pairs of connectors, and the debris on the end faces was then counted and measured. The first line shows that with an adapter without any latch arms 6 pieces of debris that had a total debris size of 20,602 $\mu m^2$ and an average size of 4120 $\mu m^2$/connector. The second line has data for a lower spring force constant in the spring 16 that biases the connector outer housing relative to the connector inner housing. There were two separate testings of 5 pairs that were mated and unmated 30 times each. This test shows that with the addition of the latch arms, the amount of debris increases relative to a connector/adapter mating pair with no latch arms in the adapter. The amount of debris is about the same in each of the two tests with the same conditions in the second line. The last line in FIG. 8 is the conventional situation where the $F_1$ is not less than $F_2$ and the amount of debris was a magnitude higher than when $F_1$ is less than $F_2$ in the line above. This data shows that the mating/unmating as illustrated in FIGS. 3-7 creates a large amount of debris and allowing the connector outer housing to be pulled back before the latch arms disengage the projection on the inner housing significantly reduces the debris. The configuration of no latch arms is not possible in the current environment.

Another set of data is illustrated in FIG. 9. Again, 5 pairs of connectors were mated and unmated 30 times and the total amount and size of the debris was collected and measured. In FIG. 9, the last line corresponds to the situation illustrated in FIGS. 3-7, where more debris is generated. The second line illustrates that the lower spring constant and lower spring force in the spring 16 between the connector outer and inner housings, reduces the amount of debris from the standard configuration. The first line further illustrates that if the spring forces between the two housings is reduced and the engagement of the latch arms and the inner housing is better, then the amount of debris is further reduced. To achieve a better engagement, the configuration of the latch arm and the side of the connector inner housings should correspond to one another. If they do not have a similar configuration (e.g., the latch arm is more curved than the connector inner housing), then the latch arm may skive the side of the connector inner housing, producing more debris.

Figure 10:
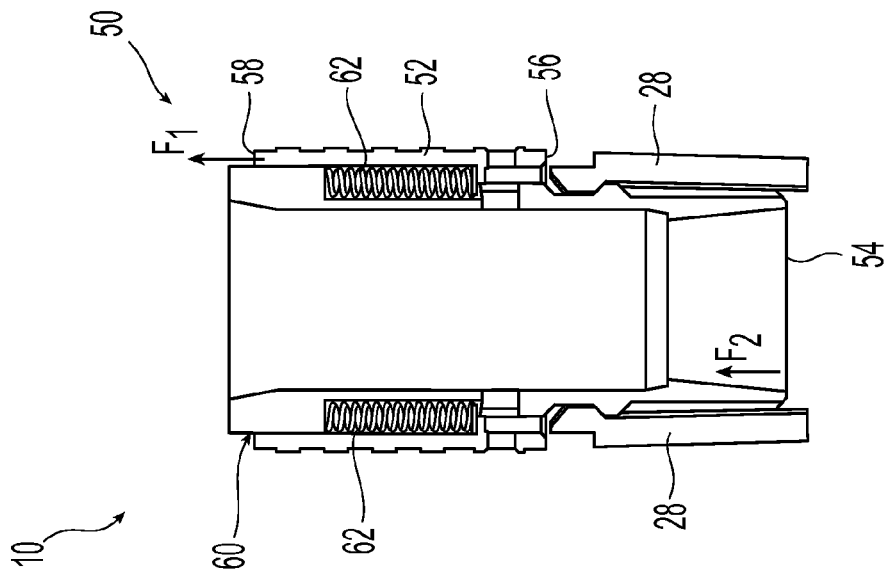
FIG. 10 is a partial cross section view of an inner and outer connector housing during disengagement from the latch arms of one embodiment according to the present invention (same as FIG. 6 for the lower COH spring force—COH moved away before the CIH moves over projection)

FIG. 10 illustrates one embodiment of a connector 50 according to the present invention. As illustrated above, only the connector outer housing 52 and the connector inner housing 54 are illustrated, the ferrule, guide pins, pin-keeper, springs, crimp body, boot and optical fibers are not illustrated for clarity purposes. The connector outer housing 52 has a front end 56, a back end 58, and an opening 60 that extends therebetween. The connector inner housing 54 is inserted into and moves relative to the opening 60. The connector outer housing 52 is resiliently biased forward by at least one resilient member 62 and more likely two, which, as noted above, are preferably coil springs. When removing the connector 50 from an adapter, such as adapter 20, the resilient member 62 is chosen such that the connector outer housing 52 can be pulled rearwardly such that the front end 56 of the connector outer housing clears the latch arms 28 before the latch arms 28 begin to move outward and over the projections 64 on the connector inner housing 54. Thus, according to the conventions used above, $F_1$ is less $F_2$ and the latch arms 28 will not hit the connector outer housing 52 when disconnecting, thereby eliminating the cause of debris.

Figure 12:
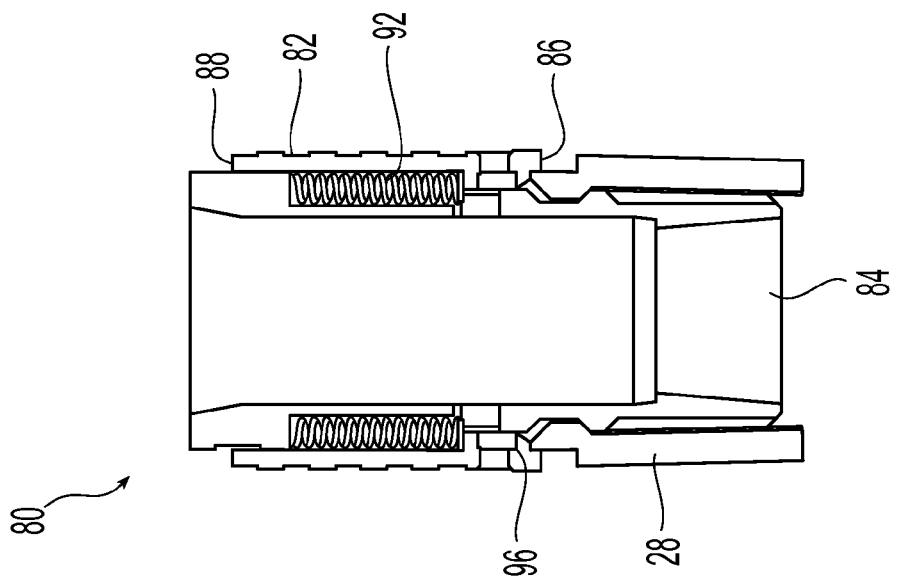
FIG. 12 is a partial cross section view of an inner and outer connector housing during disengagement from the latch arms of one embodiment according to the present invention.
Figure 11:
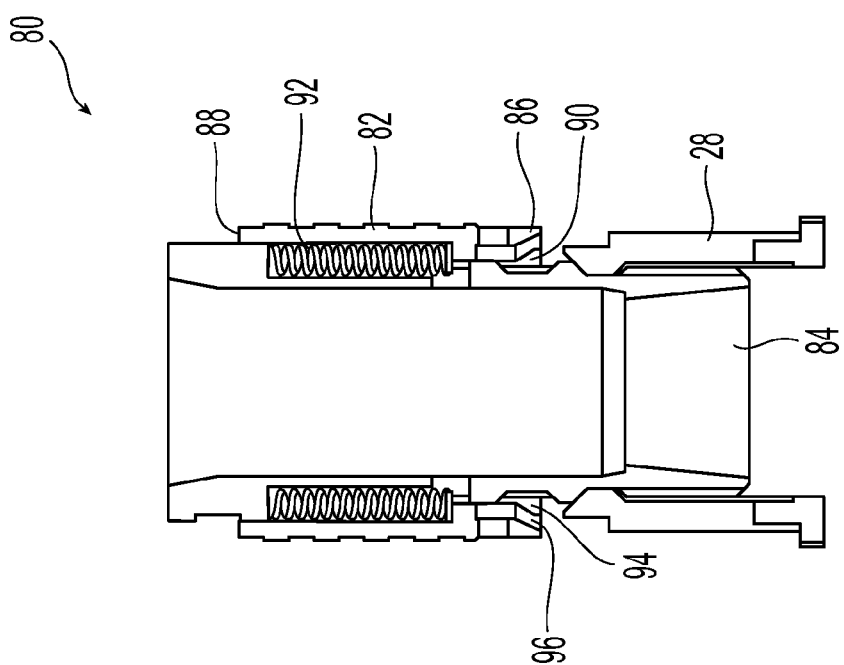
FIG. 11 is a partial cross section view of an inner and outer connector housing prior to engagement with the latch arms of the adapter of another embodiment according to the present invention (chamfered COH)
Figure 13:
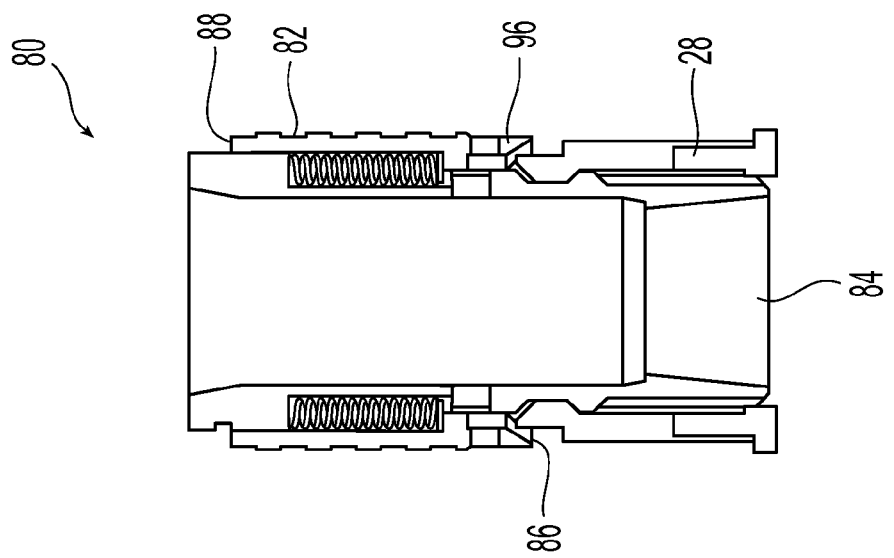
FIG. 13 is a partial cross section view of an inner and outer connector housing after engagement with the latch arms of the adapter.

FIGS. 11-13 illustrate another embodiment of a connector 80 according to the present invention. FIG. 11 illustrates the connector 80 before locking with an adapter. FIG. 12 illustrates connector 80 at disengagement from the connector and FIG. 13 illustrates connector 80 the locked position in the adapter. As illustrated above, only the connector outer housing 82 and the connector inner housing 84 are illustrated, the ferrule, guide pins, pin-keeper, springs, crimp body, boot and optical fibers are not illustrated for clarity purposes. The connector outer housing 82 has a front end 86, a back end 88, and an opening 90 that extends therebetween. The connector inner housing 84 is inserted into and moves relative to the opening 90. The connector outer housing 82 is resiliently biased forward by at least one resilient member 92 and more likely two, which, as noted above, are preferably coil springs.

The opening 90 has an inner surface 94, and the inner surface has a groove 96 on each side of the connector outer housing 82. The groove 96 corresponds to the position and length of the latch arms 28. Thus, even if the resilient member 92 does not have a reduced spring constant, the latch arms 28 will not make contact with the connector outer housing 82 as the latch arms 28 extend outward as they move over the projection 98 on the connector inner housing 84. This is because as the latch arms 28 move outward, they will pass into the grooves 96 rather than hit the inner surface 94 of the connector outer housing 82. This effectively shortens the connector outer housing and/or functions as if the connector outer housing 82 were able to move rearwardly beyond the leading edge of the latch arms before the latch arms move outwardly. The grooves 96 may be chamfered, with the chamfered portion 100 at the rearward end of the groove 96.

Figure 14:
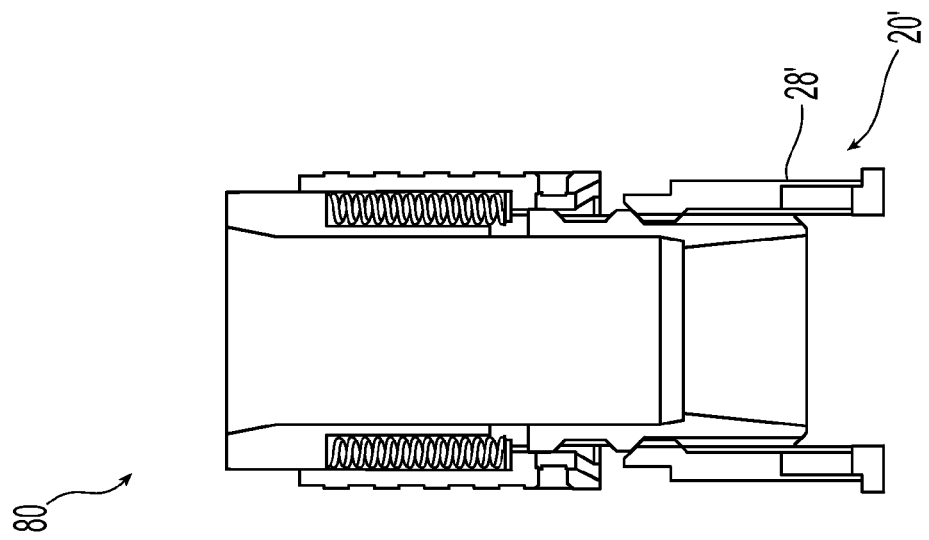
FIG. 14 is a partial cross section view of an inner and outer connector housing prior to engagement with the latch arms of the adapter of another embodiment according to the present invention (elongated latch arms)

The connector 80 may also be used with an adapter 20' that has longer latch arms 28'. As noted above with regard to FIG. 9 where it is illustrated that a reduced latch force against the connector inner housing 84 also reduces the debris. Assuming that the adapters are made from the same material, the longer latch arms 28' will apply less force against the projection 98 and the connector inner housing 84 than the normal length latch arms. FIG. 14 illustrates connector 80 with the adapter 20' having longer latch arms 28', which would reduce the latch forces against the connector inner housing 84.

Figure 17:
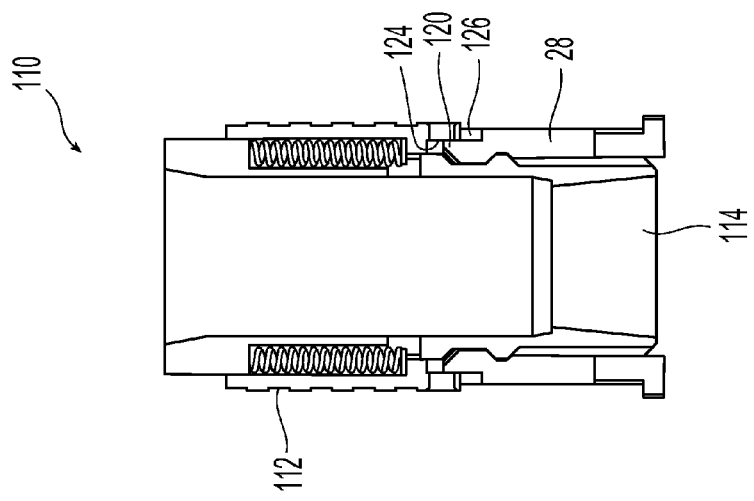
FIG. 17 is a partial cross section view of an inner and outer connector housing after engagement with the latch arms of the adapter.
Figure 16:
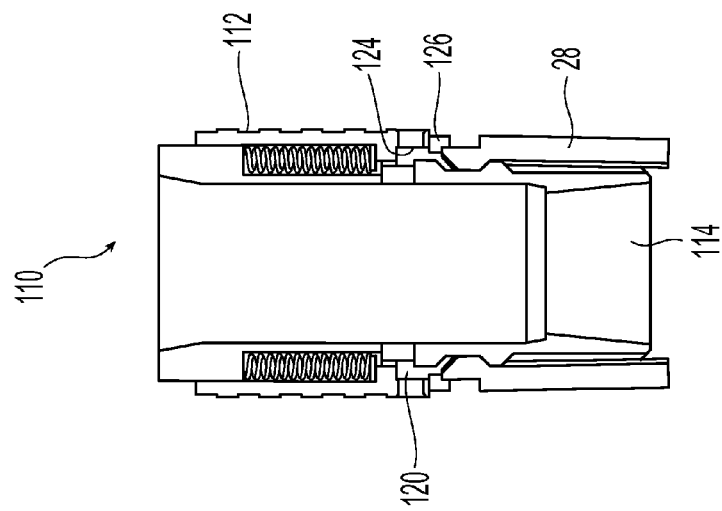
FIG. 16 is a partial cross section view of an inner and outer connector housing during disengagement from the latch arms of one embodiment according to the present invention.
Figure 15:
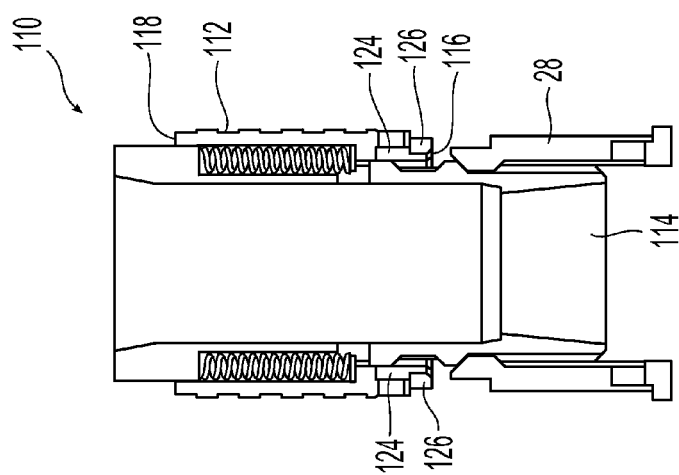
FIG. 15 is partial cross section view of an inner and outer connector housing prior to engagement with the latch arms of the adapter of another embodiment according to the present invention (shortened COH)

FIGS. 15-17 illustrate another embodiment of a connector 110 according to the present invention. FIG. 15 illustrates the connector 110 before locking with an adapter. FIG. 16 illustrates connector 110 at disengagement from the connector and FIG. 17 illustrates connector 110 the locked position in the adapter. As illustrated above, only the connector outer housing 112 and the connector inner housing 114 are illustrated, the ferrule, guide pins, pin-keeper, springs, crimp body, boot and optical fibers are not illustrated for clarity purposes. The connector outer housing 112 has a front end 116, a back end 118, and an opening 120 that extends therebetween. The connector inner housing 114 is inserted into and moves relative to the opening 120. The connector outer housing 112 is resiliently biased forward by at least one resilient member 122 and more likely two, which, as noted above, are preferably coil springs.

The connector outer housing 112 has an inner surface 124 and a cut-out or opening 126 on and into each side of the connector outer housing 112. The opening 126 corresponds to the position and length of the latch arms 28. Thus, even if the resilient member 122 does not have a reduced spring constant, the latch arms 28 will not make contact with the connector outer housing 112 as the latch arms 28 extend outward as they move over the projection 128 on the connector inner housing 114. This is because as the latch arms 28 move outward, they will pass into the openings 126 rather than hit the inner surface 124 of the connector outer housing 112. This effectively shortens the connector outer housing and/or functions as if the connector outer housing 112 were able to move rearwardly beyond the leading edge of the latch arms before the latch arms move outwardly.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber optic connector for insertion into an adapter, the adapter having at least one latch, the connector comprising:
an inner connector housing having at least one projection to interact with the at least one latch;
an outer connector housing, the outer connecting housing surrounding at least a portion of the inner connector housing, the outer connector housing passing over the at least one latch when inserted into the adapter; and
a resilient element engaging the inner connector housing and the outer connector housing and biasing the outer connector housing toward a front end of the inner connector housing, the resilient member having a spring force that is less than a spring force applied by the at least one latch against the at least one projection during insertion or removal of the inner connector housing from the adapter.

2. The fiber optic connector according to claim 1, wherein the resilient member has a spring constant and the spring constant is smaller than that of a spring constant of the at least one latch.

3. The fiber optic connector according to claim 1, wherein the spring force of the at least one latch is reduced by lengthening the at least one latch.

4. The fiber optic connector according to claim 1, wherein the resilient member is a coil spring.

5. A fiber optic connector for insertion into an adapter, the adapter having at least one latch, the connector comprising:
an inner connector housing having at least one projection to interact with the at least one latch;
an outer connector housing having a front end, a back end, and an opening extending therebetween, the opening having a surface and surrounding at least a portion of the inner connector housing, the surface having at least one groove extending from the front end towards the back end to receive at least a portion of the at least one latch through the front end; and
a resilient element engaging the inner connector housing and the outer connector housing and biasing the outer connector housing toward a front end of the inner connector housing.

6. The fiber optic connector according to claim 5, wherein the outer connector housing passing over the at least one latch when the inner connector housing is inserted into the adapter.

7. The fiber optic connector according to claim 5, wherein the at least one groove is chamfered.

8. The fiber optic connector according to claim 5, wherein the inner connector housing extends beyond the front end of the outer connector housing and the outer connector housing passing over the at least one latch when inserted into the adapter.

9. The fiber optic connector according to claim 5, wherein the at least one latch engages the surface of the opening in the outer connector housing rearwardly of the front end.

10. A fiber optic connector for insertion into an adapter, the adapter having at least one latch, the connector comprising:
an inner connector housing having at least one projection to interact with the at least one latch;
an outer connector housing having a front end, a back end, and an opening extending therebetween, the opening surrounding at least a portion of the inner connector housing, the outer connector housing having at least one side opening corresponding to the at least one latch and at least one projection, the side opening extending from the front end towards the back end and disposed to receive a laterally moved at least one latch; and
a resilient element engaging the inner connector housing and the outer connector housing and biasing the outer connector housing toward a front end of the inner connector housing.

* * * * *